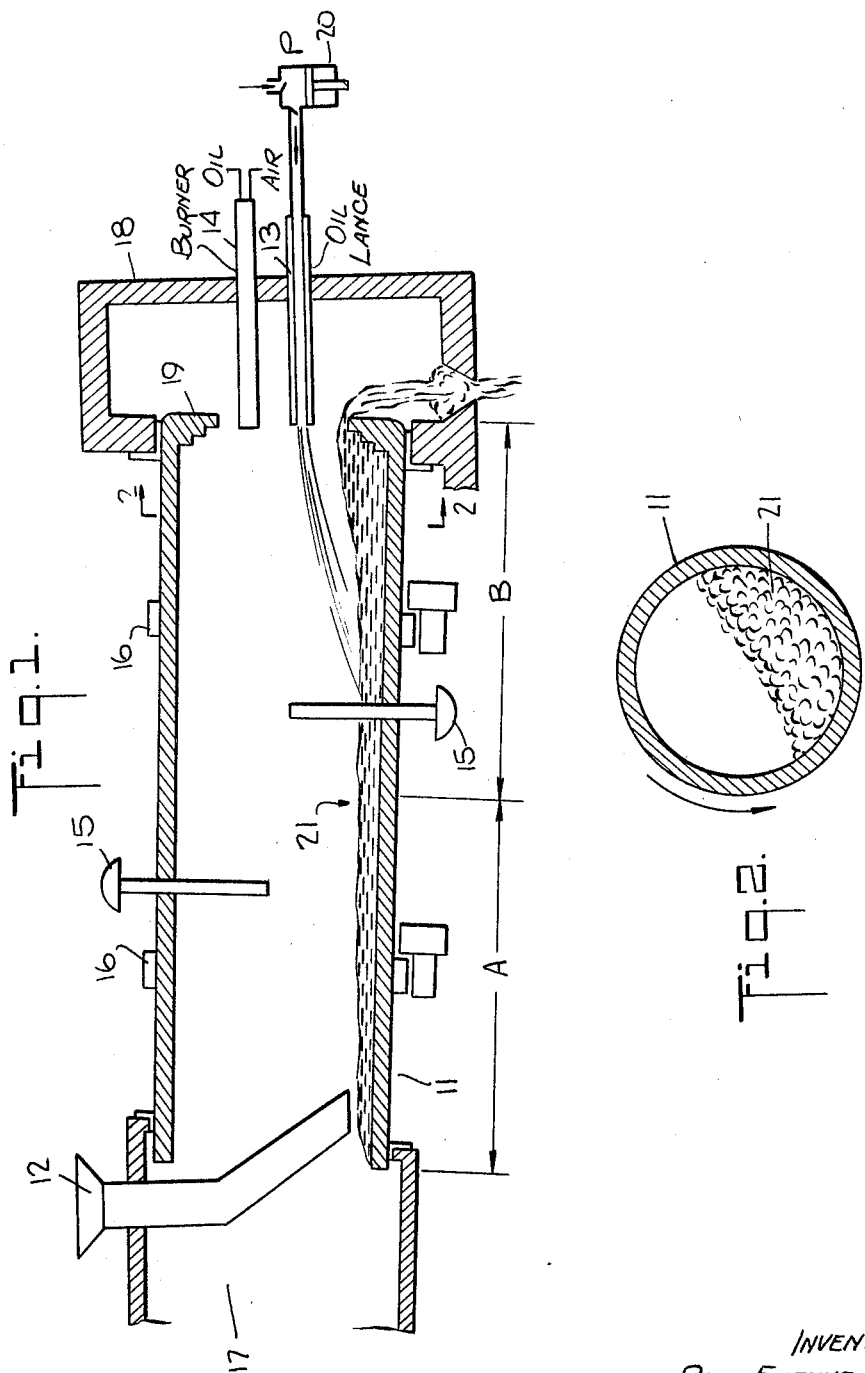

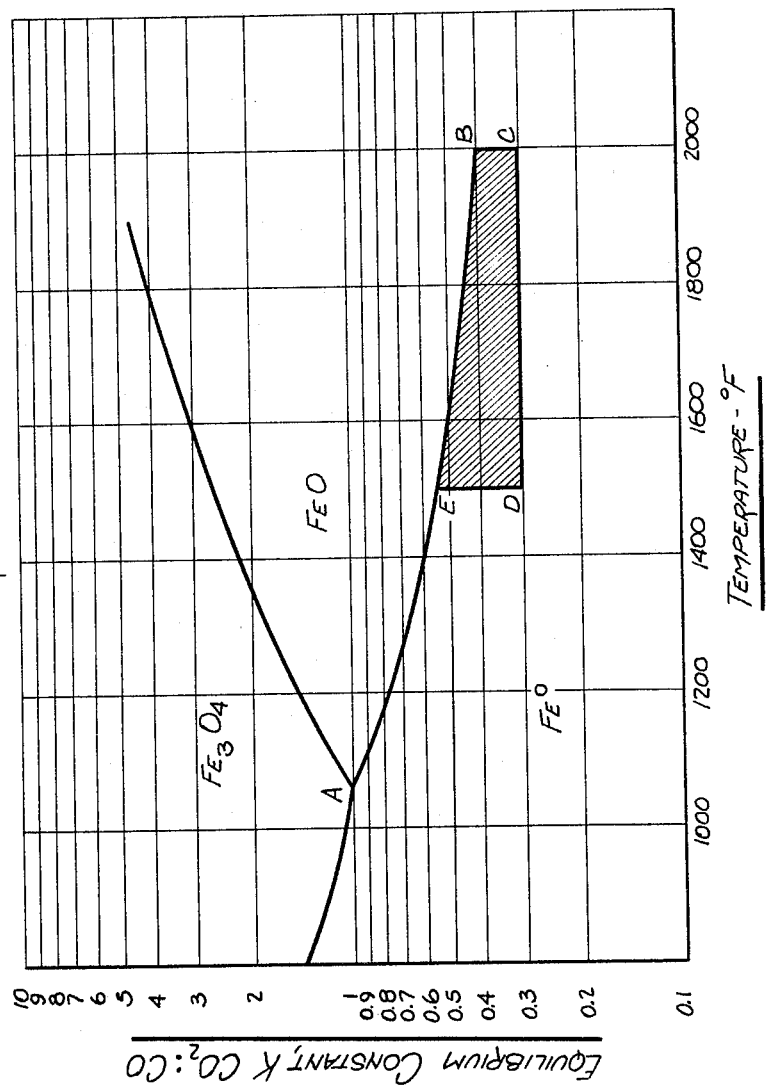

United States Patent Office

3,272,616
Patented Sept. 13, 1966

3,272,616
METHOD FOR RECOVERING NICKEL FROM OXIDE ORES
Paul E. Queneau, Fairfield, Conn., Philip E. Brubaker, Texas City, Tex., and Charles E. O'Neill, Upper Montclair, N.J., assignors to The International Nickel Company, Inc., New York, N.Y., a corporation of Delaware
Filed Mar. 25, 1964, Ser. No. 354,641
Claims priority, application Canada, Dec. 30, 1963, 892,353
10 Claims. (Cl. 75—21)

The present invention relates to a process for the treatment of lateritic nickel-containing ores and, more particularly, to the treatment of such ores in order to recover the nickel content thereof in a form suitable for commercial use. This novel process effects substantial improvement in the economy of lateritic ore treatment by permitting direct, full utilization of liquid hydrocarbons alone in controlled ore reduction prior to metal recovery.

The improved process is particularly adaptable to treating oxide ores found in many areas of the world which are deficient in solid fuel resources. On a dry basis, such ores normally contain substantially less than 5% nickel and not more than about 50% iron by weight. Thus, such ores may contain about 10% to about 40% iron and will contain about 5 times to about 30 times as much iron as nickel by weight. The hereindescribed process is particularly adaptable for the treatment of lateritic ores containing iron and nickel in a ratio of less than about 30 to 1.

Heretofore, in commercial pyrometallurgical practice nickel-containing lateritic ores have been treated by the blast furnace, Krupp-Renn and electrosmelting processes for the recovery of nickel. These processes have involved the use of solid fuel. Processes employing coal or coke have required excessive amounts of fuel to secure necessary reducing conditions. As a result, the product has a high iron and an undesirably low nickel content. In contrast, the selectively reduced ore of the present invention is in a condition amenable to smelting operations such that the nickel content thereof may be recovered with a much higher ratio of nickel to iron in the product than that contained in the feed.

It has now been discovered that oxide ores may be selectively reduced using low-cost liquid hydrocarbons so as to provide a material which is amenable to smelting operations to recover the value metal content with high metal recovery and with high concentration in the product.

It is an object of the present invention to provide a method for controlled reduction of a nickel- and iron-containing lateritic ore to optimize its amenability to smelting operations and minimize overall energy consumption.

It is another object of the invention to provide a method for controlled reduction of a nickel- and iron-containing lateritic ore utilizing liquid hydrocarbons as the only source of energy.

It is a further object of the invention to provide a method for treating a nickel-containing lateritic ore wherein a low grade liquid fuel alone is employed to obtain a high concentration of nickel in the product.

Other objects and advantages of the invention will be apparent from the following description taken in conjunction with the accompanying drawing in which:

FIGURE 1 shows a longitudinal section through a rotary kiln-type furnace in which lateritic nickel- and iron-containing ores may be treated according to the invention;

FIGURE 2 depicts a cross section of the same furnace; and

FIGURE 3 is a diagram depicting the relationship of temperature and reducing atmosphere, ratio of carbon dioxide to carbon monoxide, upon the equilibrium of iron and its oxides. It will be understood, of course, that nickel in solid solution in iron phases affects the activity of iron.

Generally speaking, the present invention contemplates an improved process for concentrating and recovering nickel contained in a lateritic ore containing iron and nickel by subjecting the ore to a reduction treatment under controlled conditions of atmosphere and temperature obtained through the admixture of a liquid hydrocarbon therewith to reduce at least a substantial part of the nickel and a controlled part of the iron content, i.e., less than 50% of the iron content, of the ore to the metallic state. For kinetic reasons, at least about one part of iron contained in the ore is so reduced for each part of nickel contained in the ore. The reduced ore is then melted to effect phase separation and to recover a product containing more than about 25% nickel, e.g., 40% nickel, and with high overall recovery of nickel initially contained in the ore; for example, at least about 90% of the nickel is recovered. The metallic iron in the reduced ore acts to free chemically combined nickel during the melting operation and thus contributes to overall high recovery of contained nickel in the process.

Advantageously, the nickel-containing lateritic ore is crushed to a particle size of less than about one inch and is dried. The ore is then preheated to a temperature on the order of about 1500° F. by contact with hot gases with conditions during the preheating operation being controlled such that when the ore reaches or exceeds about 1000° F., the hot gases in contact therewith are reducing to nickel. The preheated ore having a temperature of about 1500° F. is formed into a tumbling bed and is mixed with oil to form an intimate mixture between the preheated ore and the oil. A particularly efficacious oil for use in the process is a heavy crude oil, e.g., Bunker C fuel oil. The lighter constituents of the oil are volatilized and flash off while the heavier constituents enter into and become admixed with the bed. These lighter constituents react with oxygen-containing gases such as air over the bed to provide heat for the process. Controlled quantities of air are introduced such that strongly reducing conditions are generated within the bed, i.e., the ratio of reducing constituents ($CO$, $H_2$) to oxidizing constituents ($CO_2$, $H_2O$) is equivalent to a ratio of carbon monoxide to carbon dioxide within the bed of at least about 3 to 2, and advantageously, on the order of at least about 2 to 1. This unusually high equivalent ratio at the high discharge temperature contemplated serves to afford the requisite reduction of iron in the bed in accordance with the special concepts of the present invention and also enables achievement of the kinetic conditions necessary to achieve iron reduction at unusually high throughput rates. Additional heat for the process may be supplied by combustion of oil in a burner. In this manner, through combustion of a liquid fuel alone, the tumbling, burning bed is heated up to a temperature below the incipient fusion temperature for the bed material. This temperature is most advantageously just below the incipient fusion temperature for the bed material so that no substantial ore agglomeration occurs and may be, for example, on the order of about 2000° F. Introductions of oil and of air at controlled rates are continued for a sufficient time to reduce a substantial part of the nickel and a controlled proportion of the iron in the bed material. The reaction within the bed proceeds with so minor a formation of coke that the reduced ores does not contain more than about 2% carbon at the time the reduction operation is completed. The carbon produced is useful in the subsequent transfer and melting operations. If desired for purposes of producing a nickel-containing matte as the product of the melting operation forming part of the process, sulfur may be fixed in the bed material without other substantial change in operating conditions. The matte should contain at least one mol of sulfur for each two mols of nickel therein, e.g., 2 or more mols of sulfur for each 3 mols of nickel. The total sulfur requirements for sulfiding the nickel may be provided by employing a high sulfur fuel oil, e.g., an oil containing as much as 10% sulfur, in the reduction operation. Pyrites, sulfur dioxide, elemental sulfur, gypsum, anhydrite, etc., may also be employed.

The reduced ore is then melted to yield a nickel-containing product having a nickel content, on the basis of contained metal, of more than about 25%. The final nickel-containing product may be either a ferronickel or a matte. Advantageously, from the standpoints of overall heat economy, prevention of reoxidation of the reruced ore, etc., the treated ore is led directly from the selective reduction operation to the melting furnace. An electric furnace may conveniently be employed as the melting furnace with overall high heat economy because the charge to the melting furnace is already at a high temperature.

A particularly advantageous embodiment for carrying out the invention will now be discussed in relation to the accompanying drawing. For illustrative purposes, FIGURE 1 of the drawing is depicted at an exaggerated scale in regard to the length to diameter of the kiln. In the drawing, reference character 11 denotes a rotary kiln at a small slope, e.g., about 2% to 4%, from the horizontal. The kiln is provided with ore feeding means 12 at one end thereof, oil feeding means 13 (which may be water jacketed if desired) and a temperature control burner 14, which also provides a flame for the tumbling, burning bed, at the other end thereof, air feeding means 15 located at intervals along the length thereof, tires and/or driving means 16 for rotating the kiln, a stack 17 is provided at the gas exit end (ore feed end) of the kiln, and a housing 18 is provided at the oil feed end (reduced ore exit end) of the kiln. A dam 19 may be provided at the ore exit end of the kiln to aid in controlling flow of ore through the kiln. It will be under stood that other dams may be provided at points appropriately selected along the length of the kiln as desired for purposes of controlling ore flow. In operating the kiln in accordance with the invention, ore which previously has been dried is fed through the feeder 12 into the kiln. The rotary motion of the kiln and slight inclination thereof to the horizontal forms the ore into a tumbling bed 21 which travels slowly from the ore feed end to the lower ore exit end. As depicted in FIGURE 2 of the drawing, the bed continually climbs partly up the kiln wall under the influence of the rotary kiln motion and tumbles. Conditions within the kiln are maintained such that zone A designated in FIGURE 1 is maintained as a preheating zone wherein the tumbling bed of ore is gradually preheated to a temperature on the order of 1500° F. It is advantageous to employ lifters in at least part of the preheating zone (zone A) to facilitate contact between the bed and the hot gases thereabove. Zone B depicted in FIGURE 1 of the drawing is maintained as a reducing zone wherein the tumbling bed of ore is subjected to reducing conditions derived from the oil introduced directly onto the bed and wherein the tumbling ore bed is further heated such that it attains a temperature on the order of up to about 2000° F. at the ore exit end of the kiln. Lifters are normally not employed in the reduction zone (zone B) so that a desirable quiescent type of condition is created in the bed with the result that there is minimum disturbance of the strong reducing condition in the bed. It will be appreciated that movement of the ore and of gases through the kiln are maintained countercurrent to each other. In a particularly advantageous embodiment as depicted in the drawing, oil is injected at the point adjacent the ore outlet end of the kiln by means of an oil injector or lance supplied with oil under pressure from reciprocating pump 20. In this way, a stream or spray of oil is brought in contact with the tumbling bed over a considerable distance thereof in the reducing zone since the oil spray is caused to have a pulsing motion as the pressure therein rises and falls under the impulse of reciprocating pump 20. Air in the carefully controlled amounts required to maintain the strong reducing conditions within the reducing zone is introduced at selected intervals along the length of the kiln by means of feeders 15. Further preheated air may be supplied through burner 14 by introducing excess air through the burner such that a burner flame temperature in the approximate range of about 2000° F. to about 3000° F. is maintained. It will be appreciated that as further air is introduced into the gas stream moving along the kiln to the stack by means of feeders 15, it becomes increasingly less reducing and may even become oxidizing by the time the gas stream reaches the point where the bed temperature is about 1000° F. or less. In this manner, substantially complete combustion of oil in the kiln is achieved, thus enabling the process to be conducted with high fuel economy. It will be appreciated that other means may be employed for injecting or jetting oil into the bed in the reducing zone. It will be appreciated that the burner which may be employed for the purposes of temperature control normally supplies only a minor proportion of the total fuel requirements needed to heat the ore in the kiln. Thus, in one installation, the proportion of oil added through the burner was about 25% of the oil supplied to the kiln. In practice, the amount of oil supplied to the burner is at least about 10% but is normally less than 50% of the oil supplied to the kiln. In the manner described hereinbefore, a strong local reducing atmosphere is generated within the reducing zone of the bed but, nevertheless, little production of carbon results.

The concept of introducing the major proportion of the total oil supply required for reduction of the ore by direct application to and admixture with the ore in the reducing zone of the kiln while introducing only a minor proportion of the oil requirements through a burner offers many process advantages from the standpoints of reducing atmosphere control, heat supply control, overall fuel economy and the ability to conduct the reduction operation using liquid hydrocarbons as the sole fuel supply. When it is attempted to operate a rotary kiln or other apparatus for the controlled reduction of iron while achieving the high discharge temperatures contemplated in accordance with the invention by total supply of reducing components resulting from direct combustion of oil in burners, it is found that the burners must be operated with such an insufficiency of oxygen that a substantial proportion of the oil is formed into carbon and reports as soot in the exhaust gases or in the treated ore. When the concepts of the invention are applied on a practical basis, the proportion of oil mixed with the bed and the proportion of oil directly supplied to the burner can be varied to meet operating requirements. It is then readily possible to achieve the necessary controls of operating conditions including heat supply by means of the proportion of oil directly burned in the burner while maintaining the very strong reducing atmosphere in the bed. It will be appreciated that the invention thus provides a means whereby the reduction operation can be conducted with relatively simple apparatus while employing liquid hydrocarbons as the sole source of fuel to the reduction operation.

FIGURE 3 depicts, in an illustrative manner, the iron-iron oxide equilibria as affected by reducing atmosphere and temperature. Of particular interest to the process embodying the present invention is the line A–B which generally sets forth the Fe-FeO boundary as this boundary is affected by temperature and atmosphere. FIG- URE 3 demonstrates that as the temperature is increased, a more strongly reducing atmosphere is required in order to reduce iron. In order to achieve reduction of iron contained in the ore as contemplated in accordance with the invention, conditions in the reduction zone as described hereinbefore are maintained such that the ratio of oxidizing constituents ($CO_2$, $H_2O$) to reducing constitutes (CO, $H_2$) in the atmosphere in the bed is equivalent to a $CO_2$:CO ratio within the field BCDE depicted in FIGURE 3. It is to be appreciated that the conditions depicted in FIGURE 3 are illustrative only since in the treatment of nickel-containing materials the actual reducing atmosphere requirements in the bed are alleviated by the change in activity of iron due to partial solid solution of nickel in the iron phases. The strong reducing conditions required, i.e., an equivalent CO:$CO_2$ ratio of more than about 3:2, are obtained in a particularly efficacious manner by the process embodying the invention.

The reduced hot ore resulting from the reduction operation described hereinbefore is then readily amenable to direct melting operations adapted to recover and concentrate the nickel content thereof as a nickel-iron material.

For the purpose of giving those skilled in the art a better understanding of the invention, the following illustrative example is given:

EXAMPLE I

Lateritic ore containing 35% water was dried to a moisture content of 3%. The dried ore contained 1.8% nickel, 17.4% iron with the balance being gangue constituents. The ore was then crushed to minus one-half inch size and was selectively reduced in a rotary kiln such as described hereinbefore and depicted in the attached drawing. The dried ore was fed continuously to a kiln about 5 feet in diameter and 40 feet long rotating at 1.5 r.p.m. at a rate of about 12 tons per day to form a tumbling ore bed which moved slowly to the ore exit end (fired end) of the kiln. The sole fuel employed in firing the kiln was a heavy fuel oil, a part of which was burned in a burner located at the exit end of the kiln while the remaining portion of the oil was jetted as a reciprocating pulsed jet directly upon and into the hot ore approaching the ore exit end of the kiln. One-third of the total oil requirements was fed through the burner while two-thirds of the oil requirements were jetted directly on and were admixed with the ore. The oil consumption amounted to about 9.1% by weight of the ore fed to the kiln. Combustion conditions were controlled by addition of air to the kiln at selected points along the length thereof such that the exhaust gas contained about 0.5% excess oxygen. The tumbling ore bed was preheated by countercurrent contact with hot combustion gases generated in the kiln and the pulsing oil jet contacted the portion of the bed comprising the reduction zone of the kiln in which there were no lifters and wherein the bed had a temperature above about 1500° F. so as to effect further heating of the bed by partial combustion immediately above the bed of the distillation products flashed from the oil and to effect reduction of a substantial proportion of the nickel content and a controlled part of the iron contact therein by the strong reducing atmosphere generated within the bed as a result of the admixture of oil therewith. The reduced ore was discharged from the exit end of the kiln at a temperature of 1890° F. and it was found that about 19.6% of the iron content in the reduced ore was reduced to metal. The hot ore contained about 0.8% carbon. The exhaust gas had a temperature of about 450° F. and contained a negligible amount of residual thermal value. The reduced hot ore was directly fed to and melted in an electric furnace on a continuous basis to provide a ferronickel containing about 43% nickel and 52% iron with recovery in the ferronickel of about 95% of the nickel contained in the ore. The foregoing represented completely satisfactory operating conditions. It was found that the kiln could be operated continuously for long time periods while achieving satisfactory results.

EXAMPLE II

A further run was made employing the same feed, equipment and operating procedure described in Example I except that about seven pounds per hour of sulfur were fixed in the bed. About 2.4 pounds per hour of this sulfur was introduced in the fuel oil supplied to the kiln while the remainder was supplied as sulfur dioxide gas. It was found that the molten product obtained in the melting furnace was a matte containing about 41.3% nickel, about 15% sulfur and the balance essentially iron, with an overall recovery of about 92% of the nickel initially contained in the core.

It is to be particularly appreciated that the reduction to metal of a controlled amount of iron in the ore is an essential control in the reduction operation contemplated in accordance with the invention. When this control is maintained it is found that a substantial part of the nickel in the ore is reduced to metal and the metallic iron made available by the novel method of conducting the reduction operation using liquid hydrocarbons intermixed with the bed is itself a reducing agent for unreduced nickel oxide during the subsequent melting operation in accordance with the invention. The product of the melting operation contains at least about 90% of the nickel contained in the ore, and a very substantial concentration of nickel is achieved in the product. Thus, products having a nickel:iron ratio of 1 to 1 are readily obtained.

It will also be appreciated that the special process of the invention involving intermixture of hot ore with liquid hydrocarbons acts as an in situ oil-gas generator or reactor. The reaction produces such a strongly reducing atmosphere that rapid heating rates, high material throughout rates and high ore discharge temperatures are achieved. The improver kinetic factors resulting from the strongly reducing atmosphere also facilitate the treatment of a course particle size feed material. It will be recognized that in treating silicate-type ores, high temperatures in the reduction operation favor the formation of olivine which may include nickel as nickel oxide. Nevertheless, the controlled amounts of metallic iron in the reduced ore reduce such nickel oxide during the subsequent melting operation so that a high overall recovery of nickel initially contained in the ore is obtained even in cases where less than half of the nickel is reduced to metal during the reduction operation. Furthermore, the product of the melting operation is high in nickel, a most desirable result. Thus, a ratio of nickel to iron in the final product on the order of about 1 to 1 or higher may be obtained even though the ratio of iron reduced to metal to nickel reduced to metal in the reduced ore may be 1.5 to 1. In accordance with the invention, a ferronickel containing at least 50% nickel may be obtained with good overall nickel recovery.

It is further to be appreciated that in many areas of the world in which lateritic ores of the type treated in accordance with the invention occur, solid fuels such as coal are expensive. Oil is usually available in such areas at a lower price in terms of equivalent thermal value. Accordingly, the invention affords a further economic advantage that oil, the available fuel, may be employed exclusively in the reduction operation. Furthermore, since the reduced ore is at a high temperature, i.e., at least about 1500° F., and more advantageously 1600° F. or higher, as it is discharged from the kiln and may then be immediately charged into the melting furnace without any substantial loss of heat, the heat requirements in melting are relatively low. It will also be appreciated that other oxidic iron-containing materials, such as roasted nickeliferous or cupriferous concentrates or mattes, siliceous copper ores or iron ores, etc., may be advantageously treated in acordance mith the invention to provide concentration and recovery of metal values contained therein. The ferronickel or iron-nickel matte provided in accordance with the invention may be further concentrated by oxygen top-blowing as is described, for example, in U.S. Patent No. 3,030,201 and U.S. Patent No. 3,004,846.

As pointed out hereinbefore, materials to be treated in accordance with the invention need only be crushed such that particles thereof will pass a one inch screen. There is no necessity for fine comminution of the fuel materials. This advantageous feature of the invention not only effects a saving in grinding costs but greatly alleviates the dusting problem always encountered in the exit gases from rotary kilns treating finely divided material.

It will be appreciated that in operating in accordance with the invention to effect reduction of nickel in feed materials containing nickel and iron, such as lacteritic ores, it is advantageously desirable for economic reasons to reduce less than 50% of the iron contained in the feed. However, substantially all of the iron in the feed can be reduced to the metallic state in special circumstances by providing a longer residence time for the material being treated in the reduction zone.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

We claim:

1. The process for recovering nickel from lateritic ores which comprises preheating said ore to a temperature of at least about 1500° F., introducing oil into a bed of said preheated ore while maintaining said bed in a state of tumbling movement so as to cause intimate admixture of oil with said bed, combusting said oil under controlled conditions to generate a strong reducing atmosphere within said bed and to heat said bed to a temperature below the incipient fusion temperature, reducing a substantial proportion of the nickel and at least about one part of iron for each part of nickel within said bed material, and melting the reduced ore to recover the nickel content contained therein.

2. The process according to claim 1 wherein the quantity of oil introduced directly into the bed is sufficient upon combustion to supply substantially all the fuel required to heat and reduce said bed.

3. The method according to claim 1 wherein the atmosphere in the bed within the reducing zone is equivalent in reducing power to a carbon monoxide to carbon dioxide ratio of at least about 3 to 2.

4. The process for recovering nickel from its lateritic ores which comprises forming said ore into a tumbling bed, transporting the thus-formed bed successively through a preheating zone and a reducing zone to gradually raise the temperature of said bed to a point below the incipient fusion temperature thereof, introducing oil in intimate admixture with the tumbling bed as a bed temperature of at least 1500° F. in said reducing zone, effecting combustion of said oil under conditions controlled to generate a strong reducing atmosphere within said tumbling bed in said reducing zone to reduce a substantial proportion of nickel and at least about one part of iron for each part of nickel contained in said ore and to raise the bed temperature up to a temperature below the incipient fusion temperature of the bed material, removing said reduced ore from said reducing zone, and melting said reduced ore to recover the nickel content thereof.

5. The process according to claim 4 wherein the quantity of oil introduced directly into said bed is sufficient upon combustion to supply substantially all the fuel required to heat and reduce said bed.

6. The method according to claim 4 wherein the atmosphere in the bed within the reducing zone is equivalent in reducing power to a carbon monoxide-carbon dioxide ratio of at least about 3 to 2.

7. The process for recovering nickel from lateritic ores which comprises forming the dried ore into a tumbling bed, transporting the tumbling ore bed through a preheating zone to raise the temperature thereof to about 1500° F. while maintaining an atmosphere reducing to nickel in said preheating zone at least from the point at which the temperature of the bed reaches 100° F., transporting the tumbling ore bed through a reduction zone while intermixing oil through said bed and burning said oil at a rate producing strong reducing conditions within said bed, raising the bed temperature up to a temperature below the incipient fusion temperature for the bed material and reducing a substantial proportion of the nickel and at least about one part of iron for each part of nickel contained in said bed, removing the selectively reduced ore from said reducing zone, and melting the selectively reduced ore to recover the nickel content contained therein.

8. The process for recovering nickel from lateritic ores of the iron oxide and iron silicate type which comprises feeding said ore having a particle size not exceeding about one inch on a continuous basis to a countercurrently fired rotary kiln to form a tumbling bed of ore in said kiln, gradually heating said ore bed as it travels along the kiln through a preheating zone and a reducing zone up to a temperature below the incipient fusion temperature for the ore in the reduced condition by combustion of oil in said kiln, combusting a minor proportion of oil fed to said kiln in a burner located at the ore exit end of said kiln, spraying a major proportion of oil fed to said kiln directly upon the ore in the reduction zone of the kiln to intermix said sprayed oil with the ore in said reduction zone and to create a strong reducing condition therein such that at least one part of iron for each part of nickel in the ore feed is reduced in said reducing zone, feeding to said reducing zone an amount of sulfur up to approximately the amount required to sulfide the nickel in the ore and discharging resulting reduced ore from said reducing zone at a high temperature below the incipient fusion temperature of said reduced ore into an electric furnace to recover the nickel content of the ore as a product containing at least about 25% nickel with a recovery of at least about 90% of the nickel initially contained in the ore.

9. The method according to claim 8 wherein sulfur is added to the ore bed and nickel is recovered in the melting operation as an iron-nickel matte.

10. The method according to claim 8 wherein the atmosphere produced within the bed in the reducing zone is equivalent in reducing power to a carbon monoxide-carbon dioxide ratio of at least about 3 to 2.

References Cited by the Examiner

UNITED STATES PATENTS

| | | | |
|---|---|---|---|
| 1,717,160 | 6/1929 | Kichline | 75—21 |
| 1,893,798 | 1/1933 | Fowler et al. | 75—21 |
| 2,507,123 | 5/1950 | Sproule et al. | 75—82 X |
| 2,613,074 | 10/1952 | Woods | 266—15 |
| 2,850,377 | 9/1958 | Townshend. | |
| 3,004,846 | 10/1961 | Queneau | 75—21 |
| 3,030,201 | 4/1962 | Queneau et al. | 75—21 |
| 3,046,106 | 7/1962 | Hemminger et al. | 75—34 X |
| 3,065,958 | 11/1962 | Cerych | 266—15 |
| 3,069,254 | 12/1962 | Queneau et al. | 75—82 |
| 3,100,700 | 8/1963 | Hills | 75—82 X |
| 3,113,859 | 12/1963 | Moklebust | 75—90 X |
| 3,172,753 | 3/1965 | Walsh | 75—82 X |
| 3,180,725 | 4/1965 | Meyer et al. | 75—34 X |
| 3,197,303 | 7/1965 | Collin | 75—90 X |

HYLAND BIZOT, *Primary Examiner.*

DAVID L. RECK, *Examiner.*

H. W. TARRING, *Assistant Examiner.*

UNITED STATES PATENT OFFICE
CERTIFICATE OF CORRECTION

Patent No. 3,272,616                                            September 13, 1966

Paul E. Queneau et al.

It is hereby certified that error appears in the above numbered patent requiring correction and that the said Letters Patent should read as corrected below.

Column 2, line 69, for "ores" read -- ore --; column 3, lines 18 and 19, for "reruced" read -- reduced --; column 3, line 43, for "under stood" read -- understood --; column 5, lines 7 and 8, for "constitutes" read -- constituents --; line 63, for "contact" read -- content --; column 6, line 15, for "abount" read -- about --; line 17, for "core" read -- ore --; line 35, for "in situ" read -- in situ --, in italics; line 39, for "improver" read -- improved --; line 41, for "course" read -- coarse --; column 7, line 1, for "advantgeously treated in acordance mith" read -- advantageously treated in accordance with --; line 11, for "fuel" read -- feed --; line 18, for "lacteritic" read -- lateritic --; line 61, for "as" read -- at --; line 65, after "of" insert -- the --; column 8, line 11, for "100° F." read -- 1000° F. --.

Signed and sealed this 5th day of September 1967.

(SEAL)
Attest:

ERNEST W. SWIDER                                    EDWARD J. BRENNER
Attesting Officer                                Commissioner of Patents